(12) United States Patent
Weng (10) Patent No.: US 10,615,870 B2
(45) Date of Patent: Apr. 7, 2020

(54) NETWORK SWITCH DEVICE AND OPERATING METHOD THEREFOR

(71) Applicant: MITAC COMPUTING TECHNOLOGY CORPORATION, Taoyuan (TW)

(72) Inventor: Wei-Ti Weng, Taoyuan (TW)

(73) Assignee: MITAC COMPUTING TECHNOLOGY CORPORATION, Taoyuan (TW)

(*) Notice: Subject to any disclaimer, the term of this patent is extended or adjusted under 35 U.S.C. 154(b) by 0 days.

(21) Appl. No.: 16/358,238

(22) Filed: Mar. 19, 2019

(65) Prior Publication Data

US 2019/0305844 A1    Oct. 3, 2019

(30) Foreign Application Priority Data

Mar. 29, 2018 (TW) .............................. 107111079 A (51) Int. Cl.
*H04B 10/07* (2013.01)
*H04B 10/079* (2013.01)
*H04B 10/40* (2013.01)

(52) U.S. Cl.
CPC ......... *H04B 10/0793* (2013.01); *H04B 10/40* (2013.01); *H04B 10/07* (2013.01); *H04B 10/0791* (2013.01)

(58) Field of Classification Search
USPC .......................................................... 398/1
See application file for complete search history.

(56) References Cited

U.S. PATENT DOCUMENTS

| 4,850,045 A | 7/1989 | Funke |
| 6,140,920 A * | 10/2000 | Roberts .............. H04B 10/0795 340/514 |
| 7,020,879 B1 * | 3/2006 | Nemirovsky ......... G06F 9/4818 712/23 |

(Continued)

FOREIGN PATENT DOCUMENTS

TW          201640269 A          11/2016

OTHER PUBLICATIONS

Taiwan Patent Office, Office Action, Patent Application Serial No. TW107111079, dated Dec. 7, 2018, Taiwan.

*Primary Examiner* — Jai M Lee
(74) *Attorney, Agent, or Firm* — Rabin and Berdo PC; Hu Zhang (57) ABSTRACT

A network switch device and an operating method therefor are provided. The method includes: receiving, by a logic unit, a plurality of interrupt control signals from a plurality of optical fiber data transceivers, where each of the interrupt control signals reflects whether an operating state of each of the optical fiber data transceivers becomes anomalous or changes; combining, by the logic unit, the interrupt control signals from the optical fiber data transceivers into an interrupt combined signal; receiving, by an interrupt control pin of a processing unit, the interrupt combined signal; determining, by the processing unit, whether a logic level of the interrupt combined signal changes; and if the processing unit determines that the logic level of the interrupt combined signal changes, executing, by the processing unit, an interrupt handler, and determining which one of the optical fiber data transceivers becomes anomalous or changes.

18 Claims, 3 Drawing Sheets

(56) References Cited

U.S. PATENT DOCUMENTS

| | | | | |
|---|---|---|---|---|
| 7,174,096 | B2* | 2/2007 | Berthold | H04B 10/2503 398/1 |
| 2001/0003484 | A1* | 6/2001 | Fujita | H04J 3/085 398/1 |
| 2003/0161629 | A1* | 8/2003 | Frascolla | H04Q 11/0062 398/5 |
| 2004/0033079 | A1* | 2/2004 | Sheth | H04B 10/801 398/135 |
| 2004/0126111 | A1* | 7/2004 | Cho | H04B 10/00 398/33 |
| 2004/0197101 | A1* | 10/2004 | Sasser | H04B 10/0799 398/117 |
| 2005/0196111 | A1* | 9/2005 | Burdick | G01M 11/00 385/92 |
| 2006/0093379 | A1* | 5/2006 | Aronson | H04B 10/0775 398/208 |
| 2006/0159462 | A1* | 7/2006 | Aronson | H04B 10/2513 398/138 |
| 2007/0223917 | A1* | 9/2007 | Nagamine | H04L 41/046 398/1 |
| 2011/0135312 | A1* | 6/2011 | El-Ahmadi | H04L 1/0057 398/135 |
| 2018/0062746 | A1* | 3/2018 | Ohteru | H04B 10/272 |

\* cited by examiner

NETWORK SWITCH DEVICE AND OPERATING METHOD THEREFOR

CROSS-REFERENCE TO RELATED APPLICATION

This non-provisional application claims priority under 35 U.S.C. § 119(a) to Patent Application No. 107111079 filed in Taiwan, R.O.C. on Mar. 29, 2018, the entire contents of which are hereby incorporated by reference.

BACKGROUND

Technical Field

The present invention relates to a network switch device and an operating method therefor.

Related Art

With development of network technologies, the Ethernet has become an indispensable tool in people's lives. A network switch device plays an important role in an Ethernet system. The network switch device can transmit and exchange data packets between the Internet and a packet transceiving module, so that the Ethernet system operates normally.

Generally, a conventional network switch device may perform corresponding operations on some anomaly operations or network anomaly events. For example, the anomaly operations may be optical fiber insertion/extraction anomalies or optical fiber signal anomalies, and the anomaly events may be that some operating values (voltage, temperature, or the like) exceed a threshold. The network switch device can proactively monitor, according to a change in a pin of an interrupt signal disposed in a packet transceiving module in the network switch device, whether a network anomaly event occurs, to perform a corresponding operation. Alternatively, the network switch device may passively receive a notification from the packet transceiving module to handle the network anomaly event. However, if the network switch device proactively performs monitoring, processing resources of the network switch device are consumed and processing load on the network switch device is raised. If the network switch device passively receives a notification from the packet transceiving module, the network switch device is limited by whether the pins between the network switch device and the packet transceiving module are sufficient. Therefore, how to effectively monitor and resolve a network anomaly has been a critical issue.

SUMMARY

In view of this, the present invention provides a network switch device and an operating method therefor.

In an embodiment, a network switch device includes a plurality of optical fiber data transceivers, a logic unit and a processing unit. Each of the plurality of optical fiber data transceivers generates an interrupt control signal according to whether the optical fiber data transceiver becomes anomalous or changes. The logic unit is coupled to the optical fiber data transceivers. The logic unit is configured to: receive the interrupt control signal from each of the optical fiber data transceivers, and combine the interrupt control signals from the optical fiber data transceivers into an interrupt combined signal. The processing unit is coupled to the logic unit. The processing unit has an interrupt control pin, and the interrupt control pin receives the interrupt combined signal. The processing unit determines whether a logic level of the interrupt combined signal changes, to determine whether any one of the optical fiber data transceivers becomes anomalous or changes. If the processing unit determines that the logic level of the interrupt combined signal changes, the processing unit executes an interrupt handler and determines, which one of the optical fiber data transceivers becomes anomalous or changes.

In an embodiment, an operating method for a network switch device includes: receiving, by a logic unit, a plurality of interrupt control signals from a plurality of optical fiber data transceivers, where each of the interrupt control signals reflects whether an operating state of each of the optical fiber data transceivers becomes anomalous or changes; combining, by the logic unit, the interrupt control signals from the optical fiber data transceivers into an interrupt combined signal; receiving, by an interrupt control pin of a processing unit, the interrupt combined signal; determining, by the processing unit, whether a logic level of the interrupt combined signal changes; and if the processing unit determines that the logic level of the interrupt combined signal changes, executing, by the processing unit, an interrupt handler, and determining, in the interrupt handler, which one of the optical fiber data transceivers becomes anomalous or changes.

In conclusion, according to an embodiment of a network switch device and an operating method therefor in the present invention, the processing unit of the network switch device does not need to constantly and regularly determine whether each optical fiber data transceiver becomes anomalous or changes. The processing unit determines which one of the optical fiber data transceivers becomes anomalous or changes, only whenever an interrupt combined signal has a logic level change. In this way, processing load on the processing unit 12 can be reduced. In addition, the optical fiber data transceiver that becomes anomalous or changes can also be temporarily omitted by using an interrupt handler in real time, and a corresponding operation can be performed, to comply with a high-speed optical fiber communication application.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
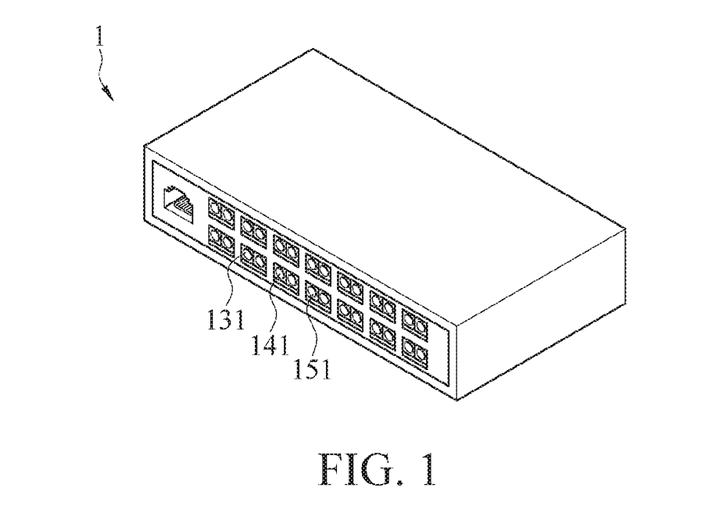
FIG. 1 is a schematic diagram of an embodiment of a network switch device according to the present invention.
Figure 2:
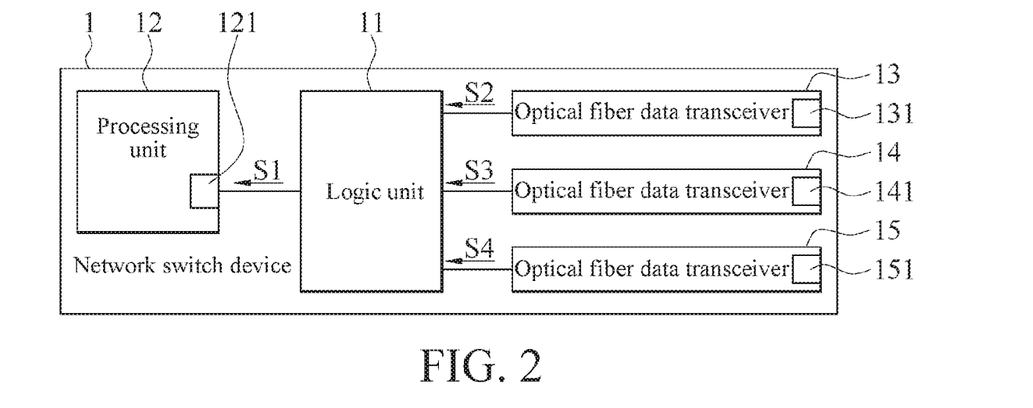
FIG. 2 is a circuit block diagram of an embodiment of the network switch device in FIG. 1.

FIG. 1 is a schematic diagram of an embodiment of a network switch device according to the present invention. FIG. 2 is a circuit block diagram of an embodiment of the network switch device in FIG. 1. Referring to FIG. 1 and FIG. 2 together, FIG. 1 and FIG. 2 show a network switch device 1. The network switch device 1 includes a logic unit 11, a processing unit 12 and a plurality of optical fiber data transceivers (fiber transceivers) 13, 14, and 15 (herein, for example, the logic unit 11 is connected to the three optical fiber data transceivers 13, 14, and 15 in FIG. 2; however, the present invention is not limited thereto, a quantity of optical fiber data transceivers connected to the network switch device 1 may be two or greater than three according to different applications).

The optical fiber data transceivers 13, 14, and 15 respectively include optical fiber ports 131, 141, and 151. The optical fiber ports 131, 141, and 151 may be connected to an optical fiber signal cable. The optical fiber data transceivers 13, 14, and 15 may receive or send, by using the optical fiber signal cable connected thereto, a data packet complying with optical fiber communication. Moreover, the optical fiber data transceivers 13, 14, and 15 can respectively generate interrupt control signals S2, S3, and S4 according to whether the optical fiber data transceivers 13, 14, and 15 become anomalous or change an operation exception or change occurs, to respectively reflect whether the optical fiber data transceivers 13, 14, and 15 become anomalous or an operating state of transceivers 13, 14, and 15 changes, thereby triggering the processing unit 12 in real time to execute an interrupt handler. In other words, the interrupt control signals S2, S3, and S4 can trigger the processing unit 12 to handle in real time an event in which the optical fiber data transceivers 13, 14, and 15 become anomalous or change. For example, when the optical fiber data transceivers 13, 14, and 15 operate normally, the optical fiber data transceivers 13, 14, and 15 may respectively send the interrupt control signals S2, S3, and S4 each with a high logic level. If operating states of the optical fiber data transceivers 13, 14, and 15 have become anomalous or changed, the optical fiber data transceivers 13, 14, and 15 may send the interrupt control signals S2, S3, and S4 each with a low logic level. Based on this, when the interrupt control signals S2, S3, and S4 each has logic change from the high logic level to the low logic level, it indicates that the optical fiber data transceivers 13, 14, and 15 become anomalous or change.

The logic unit 11 is coupled between the processing unit 12 and the optical fiber data transceivers 13, 14, and 15. The processing unit 12 has an interrupt control pin 121 coupled to an output terminal of the logic unit 11. The logic unit 11 is configured to receive the interrupt control signals S2, S3, and S4 from the optical fiber data transceivers 13, 14, and 15, and to combine the interrupt control signals S2, S3, and S4 into an interrupt combined signal S1. Then the logic unit 11 outputs the interrupt combined signal S1 to the interrupt control pin 121 through the output terminal of the logic unit 11, so as to send the interrupt combined signal S1 to the processing unit 12. In an embodiment, the logic unit 11 may be a complex programmable logic device (CPLD).

Figure 3:
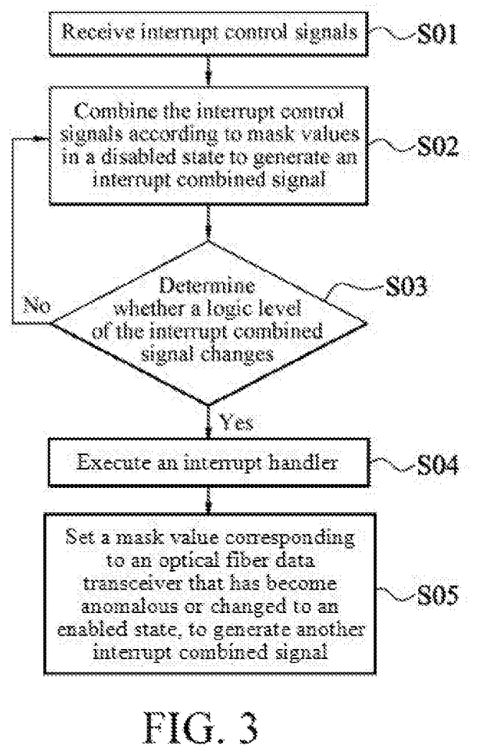
FIG. 3 is a flowchart of an embodiment of an operating method for the network switch device shown in FIG. 1 and FIG. 2.

FIG. 3 is a flowchart of an embodiment of an operating method for the network switch device shown in FIG. 1 and FIG. 2. Referring to FIG. 1 to FIG. 3 together, after receiving the interrupt control signals S2, S3, and S4 (step S01), the logic unit 11 combines the interrupt control signals S2, S3, and S4 to generate the interrupt combined signal S1 (step S02). A logic level of the interrupt combined signal S1 changes whenever the logic levels of the interrupt control signals S2, S3, and S4 change. In other words, the interrupt combined signal S1 can reflect a change in a logic level of any one of the interrupt control signals S2, S3, and S4. For example, whether the interrupt control signals S2, S3, and S4 each have a high logic level or a low logic level is used to respectively indicate whether the optical fiber data transceivers 13, 14, and 15 each operate normally or anomalously. When the interrupt control signal S2 has a logic level change, for example, from the high logic level to the low logic level, the logic level of the interrupt combined signal S1 will also have a logic level change accordingly. Similarly, when the interrupt control signal S3 has a logic level change, the logic level of the interrupt combined signal S1 will also have a logic level change accordingly. The rest can be deduced by analogy, and details are not described again. Based on this, whenever any one of the optical fiber data transceivers 13, 14, and 15 becomes anomalous or changes, the logic level of the interrupt combined signal S1 will change accordingly.

Subsequently, the logic unit 11 outputs the interrupt combined signal S1 through the output terminal of the logic unit 11. The processing unit 12 receives the interrupt combined signal S1 output by the logic unit 11. The processing unit 12 determines, according to whether the logic level of the interrupt combined signal S1 changes (step S03), whether each of the optical fiber data transceivers 13, 14, and 15 becomes anomalous or changes. For example, the processing unit 12 determines, whether the interrupt combined signal S1 has a logic level change from the high logic level to the low logic level, thereby determining whether each of the optical fiber data transceivers 13, 14, and 15 becomes anomalous or changes. If the processing unit 12 determines that the logic level of the interrupt combined signal S1 changes (that is, a determining result is "yes"), the processing unit 12 executes an interrupt handler (step S04), to determine which one of the optical fiber data transceivers 13, 14, and 15 becomes anomalous or changes. In addition, the processing unit 12 may further perform a corresponding operation upon the data transceiving device that becomes anomalous or changes.

Based on this, when the optical fiber data transceivers 13, 14, and 15 become anomalous or change, the network switch device 1 can perform, in real time by using an interrupt handler with a higher priority, a corresponding operation on the optical fiber data transceiver that becomes anomalous or changes, so as to comply with a high-speed optical fiber communication application. In addition, the processing unit 12 determine which one of the optical fiber data transceivers becomes anomalous or changes, only whenever the interrupt combined signal S1 has a logic level change. The processing unit 12 does not need to constantly and regularly determine whether any of optical fiber data transceiver becomes anomalous or changes. In this way, processing load on the processing unit 12 can be reduced.

In an embodiment, the optical fiber data transceivers 13, 14, and 15 may support an optical fiber transmission speed of 1 Gb/s, 10 Gb/s or 40 Gb/s. In addition, the optical fiber data transceivers 13, 14, and 15 may be transceivers that comply with small form-factor pluggable (SFP) specifications. The optical fiber data transceivers 13, 14, and 15 may be further connected to an electronic device, for example, a server or a personal computer, to implement 10-G Ethernet transmission among a data center, an enterprise distribution cabinet and a service provider.

Figure 4:
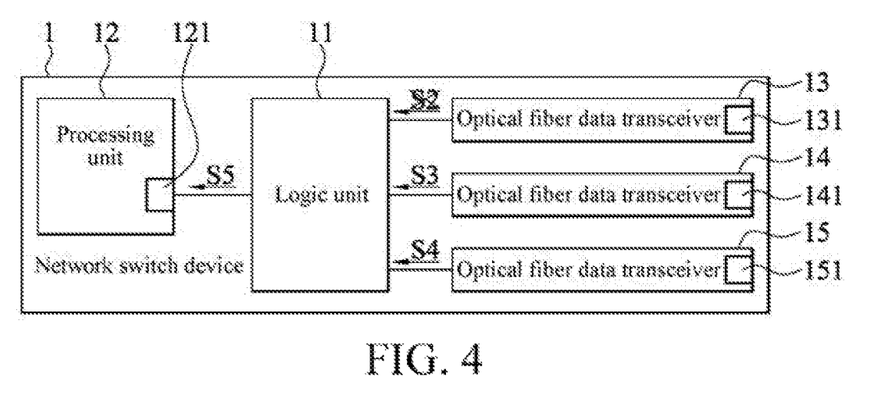
FIG. 4 is a circuit block diagram of another embodiment of the network switch device in FIG. 1.

In an embodiment, after determining which one of the optical fiber data transceivers 13, 14, and 15 becomes anomalous or changes, the processing unit 12 may control the logic unit 11 to perform step S02 again to exclude an interrupt control signal sent by the optical fiber data transceiver that becomes anomalous or changes, and combine interrupt control signals from the rest of other optical fiber data transceivers that are normal or remain unchanged, in order to generate another interrupt combined signal S5 shown in FIG. 4. In other words, the logic unit 11 does not combine the interrupt control signal outputted from the optical fiber data transceiver that becomes anomalous or changes, into the interrupt combined signal. Therefore, even if one of the optical fiber data transceivers becomes anomalous or changes, the logic unit 11 can still output an interrupt combined signal S5 that can reflect whether another optical fiber data transceiver that is normal or remains unchanged becomes anomalous or changes. For example, if the optical fiber data transceiver 13 becomes anomalous or the operating state of the optical fiber data transceiver 13 changes from a normal state to an anomalous state, the processing unit 12 can determine, in the interrupt handler executed in step S04, that the optical fiber data transceiver 13 becomes anomalous or changes. In this case, the processing unit 12 controls the logic unit 11 to exclude the interrupt control signal S2 and combine the interrupt control signals S3 and S4 into another interrupt combined signal S5 when performing step S02 again. The interrupt control pin 121 of the processing unit 12 then receives the interrupt combined signal S5, and determines, when step S03 is performed again, according to whether a logic level of the interrupt combined signal S5 changes, whether each of operating states of the optical fiber data transceivers 14 and 15 that is normal and remains unchanged becomes anomalous or changes after the optical fiber data transceiver 13 becomes anomalous. In other words, the processing unit 12 can continue to operate even if any one of the optical fiber data transceivers becomes anomalous or changes, without being affected by the optical fiber data transceiver that has become anomalous or changed, and can still determine whether another optical fiber data transceiver that is normal and whose operating state does not change becomes anomalous or changes.

In practice, the logic unit 11 stores a mask array. The mask array includes three mask values. The mask values are in a one-to-one correspondence with the optical fiber data transceivers 13, 14, and 15 (for convenience of description, the three mask values are hereinafter referred to as a first mask value, a second mask value and a third mask value respectively, and the first mask value, the second mask value and the third mask value respectively correspond to the optical fiber data transceivers 13, 14, and 15). In addition, the first mask value, the second mask value and the third mask value may be separately set to an enabled state or a disabled state. In step S02, the logic unit 11 generates an interrupt combined signal according to a mask value in the disabled state. Based on this, the first mask value, the second mask value and the third mask value are preset to a disabled state. The logic unit 11 is preset in step S02 in such a manner as generating an interrupt combined signal S1 by combining the interrupt control signals S2, S3, and S4. When the processing unit 12 in step S03 determines that the optical fiber data transceiver 13 becomes anomalous, the processing unit 12 controls the logic unit 11 to set a mask value corresponding to the optical fiber data transceiver that has become anomalous or changed to an enabled state (step S05). In other words, the processing unit 12 controls the logic unit 11 to set the first mask value to the enabled state, so that the logic unit 11 receives interrupt control signals S2, S3, and S4 again in step S01 and generates the interrupt combined signal S5 in step S02 according to the second mask value and the third mask value in the disabled state. Then, the processing unit 12 determines, in step S03, whether the logic level of the interrupt combined signal S5 changes to determine whether any one of the optical fiber data transceivers 14, 15 becomes anomalous or changes. Based on this, the processing unit 12 may control, according to whether each of the optical fiber data transceivers 13, 14, and 15 becomes anomalous or changes, the logic unit 11 to set mask values to generate different interrupt combined signals S1 and S5, so as to continue operating even if any one of the optical fiber data transceivers becomes anomalous or changes. The processing unit 12 temporarily omits the optical fiber data transceiver that has become anomalous or changed, and can still determine, without being affected by the optical fiber data transceiver that has become anomalous or changed, whether another optical fiber data transceiver that is normal and whose operating state does not change becomes anomalous or changes.

In an embodiment, the interrupt control signals S2, S3, and S4 each are preset with the high logic level. If the optical fiber data transceivers 13, 14, and 15 become anomalous or change, the optical fiber data transceivers 13, 14, and 15 output the interrupt control signals S2, S3, and S4 each with the low logic level. Herein, the logic unit 11 may perform an AND gate logic operation on the interrupt control signals S2, S3, and S4, and generate an interrupt combined signal S1 preset with the high logic level. Whenever any one of the interrupt control signals S2, S3, and S4 has logic change from the high logic level to the low logic level because the optical fiber data transceivers 13, 14, and 15 become anomalous or change, the interrupt combined signal S1 will have a logic level change from the high logic level to the low logic level. Based on this, the processing unit 12 may determine, in step S03, whether the logic level of the interrupt combined signal S1 changes from the high logic level to the low logic level, to determine whether any one of the optical fiber data transceivers 13, 14, and 15 becomes anomalous or changes.

Further, for example, if the optical fiber data transceiver 13 becomes anomalous or changes, the processing unit 12 determines, according to the interrupt combined signal S1 with the low logic level in step S04, that the optical fiber data transceiver 13 becomes anomalous or changes, the processing unit 12 may control the logic unit 11 to exclude the interrupt control signal S2, and generate the interrupt combined signal S5 with the high logic level. The processing unit 12 then determines whether the logic level of the interrupt combined signal S5 changes from the high logic level to the low logic level, so as to further determine, after the logic unit 11 excludes the interrupt control signal S2, whether the optical fiber data transceivers 14 and 15 become anomalous or changes. Therefore, whenever any one of the optical fiber data transceivers 14 and 15 becomes anomalous or changes, the interrupt combined signal S5 will have a logic change from the high logic level to the low logic level according to the interrupt control signal S3 or the interrupt control signal S4 with the low logic level, so that the processing unit 12 performs another interrupt handler according to the interrupt combined signal S5 with the low logic level, to further determine which one of the optical fiber data transceivers 14 and 15 becomes anomalous or changes.

Continuing from the above description, after controlling the logic unit 11 to exclude the interrupt control signal S2, the processing unit 12 may further control the logic unit 11 to determine whether the interrupt control signal S2 restores from the low logic level to the high logic level, to determine whether the operating state of the optical fiber data transceiver 13 restores, for example, from an anomalous operating state to a normal operating state. If the interrupt control signal S2 restores from the low logic level to the high logic level, it indicates that operation of the optical fiber data transceiver 13 restores from the anomalous operating state to the normal operating state. In this case, the processing unit 12 may control the logic unit 11 to reset the first mask value to a preset disabled state, so that the logic unit 11 regenerates the interrupt combined signal S1 based on the first mask value, the second mask value and the third mask value in the disabled state again.

Figure 5:
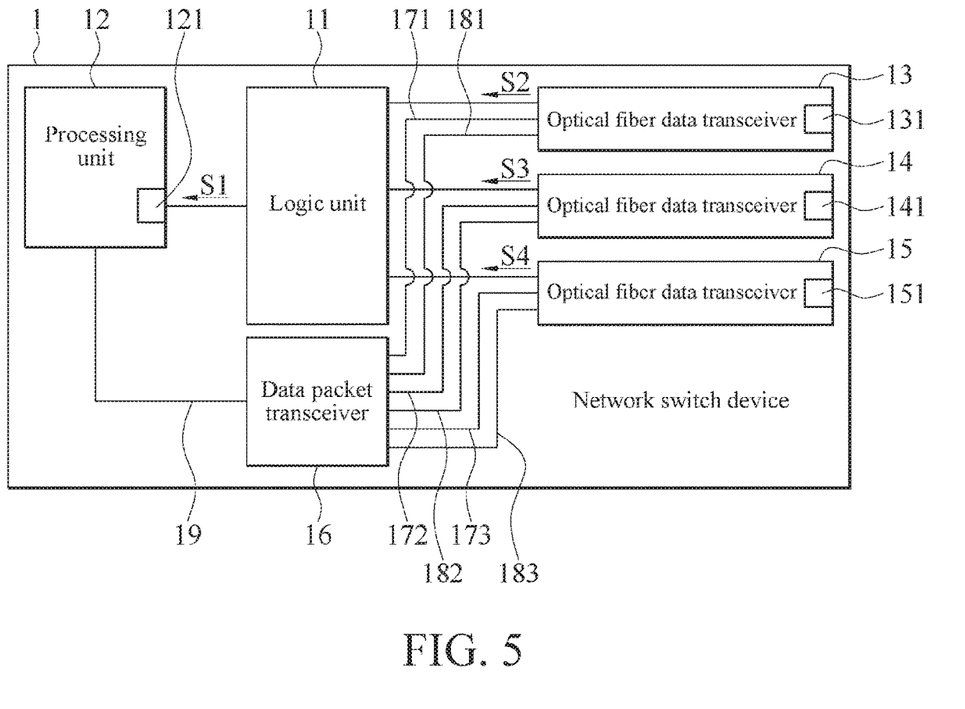
FIG. 5 is a schematic diagram of another embodiment of a network switch device according to the present invention.

FIG. 5 is a schematic diagram of another embodiment of a network switch device according to the present invention. Referring to FIG. 5, the network switch device 1 further includes a data packet transceiver 16. The data packet transceiver 16 may be a network switch chip or a network interface card (NIC). The data packet transceiver 16 is coupled between the processing unit 12 and the optical fiber data transceivers 13, 14, and 15. The data packet transceiver 16 is coupled to the processing unit 12 by using a Peripheral Component Interconnect Express (PCIe) bus 19 with a PCIe interface. In addition, the data packet transceiver 16 is coupled to the optical fiber data transceivers 13, 14, and 15 by using transmit (Tx) data buses 171, 172, and 173 and receive (Rx) data buses 181, 182, and 183. The data packet transceiver 16 may receive received data packets respectively from the optical fiber data transceivers 13, 14, and 15 by using the Rx data buses 181, 182, and 183, and then send the received data packets to the processing unit 12 through the PCIe interface 19. In addition, the data packet transceiver 16 may receive transmitted data packets from the processing unit 12 through the PCIe interface 19, and then sends the transmitted data packets to the optical fiber data transceivers 13, 14, and 15 by using the transmit data buses 171, 172, and 173. Based on this, the data buses 171, 172, 173, 181, 182, and 183 between the processing unit 12 and the optical fiber data transceivers 13, 14, and 15 are separated from the transmission lines of the interrupt control signals S2, S3, and S4 and the interrupt combined signals S1 and S5. Use of the logic unit 11 to process the interrupt control signals S2, S3, and S4 and report the interrupt combined signals S1 and S5 back to the processing unit 12 can avoid increasing pins in the data packet transceiver 16 for receiving the interrupt control signals S2, S3, and S4, and can avoid the need to upgrading, to the data packet transceiver 16, a function of sending the interrupt combined signals S1 and S5 complying with the PCIe interface 19 to the processing unit 12.

In an embodiment, anomalies occurring in the optical fiber data transceivers 13, 14, and 15 may be anomalies of some values (for example, voltage or temperature) monitored by the optical fiber data transceivers 13, 14, and 15, or anomalies of data packets received by the optical fiber data transceivers 13, 14, and 15.

In an embodiment, a change of the operation state of the optical fiber data transceivers 13, 14, and 15 may be an insertion event that an optical fiber signal cable inserts into the optical fiber ports 131, 141, and 151 of the optical fiber data transceivers 13, 14, and 15. The optical fiber data transceivers 13, 14, and 15 may send interrupt control signals S2, S3, and S4 with a low logic level when the optical fiber signal cable is inserted into the optical fiber ports 131, 141, and 151 of the optical fiber data transceivers 13, 14, and 15, to trigger the processing unit 12 to execute an interrupt handler.

Moreover, the logic unit 11 further receives an insertion/extraction signal from the optical fiber data transceivers 13, 14, and 15. The insertion/extraction signal indicates whether the optical fiber signal cable is inserted or not inserted into the optical fiber ports 131, 141, and 151 of the optical fiber data transceivers 13, 14, and 15. For example, if the optical fiber signal cable is not inserted into the optical fiber ports 131, 141, and 151, the optical fiber data transceivers 13, 14, and 15 each may send an insertion/extraction signal with a high logic level. If the optical fiber signal cable is inserted into the optical fiber ports 131, 141, and 151, the optical fiber data transceivers 13, 14, and 15 each may send an insertion/extraction signal with a low logic level. Based on this, after determining that the logic level of the interrupt combined signal S1 changes, the processing unit 12 may further determine, according to whether the logic level of the insertion/extraction signal from each of the optical fiber data transceivers 13, 14, and 15 changes, whether the optical fiber data transceivers 13, 14, and 15 become anomalous or change, or that an optical fiber signal cable is inserted into the optical fiber ports 131, 141, and 151. And, the processing unit 12 may further determine one of the optical fiber ports 131, 141, and 151 into which the optical fiber signal cable is inserted.

In conclusion, according to an embodiment of a network switch device and an operating method therefor in the present invention, the processing unit of the network switch device does not need to constantly and regularly determine whether each optical fiber data transceiver becomes anomalous or changes. The processing unit determines which one of the optical fiber data transceivers becomes anomalous or changes, only whenever an interrupt combined signal has a logic level change. In this way, the processing load on the processing unit 12 can be reduced. In addition, the optical fiber data transceiver that has become anomalous or changed can also be temporarily omitted by using an interrupt handler in real time, and a corresponding operation through the interrupt handler can be performed, to comply with a high-speed optical fiber communication application.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A network switch device, comprising:
   a plurality of optical fiber data transceivers, wherein each of the optical fiber data transceivers generates an interrupt control signal according to whether the optical fiber data transceiver becomes anomalous or changes;
   a logic unit, coupled to the optical fiber data transceivers, and configured to receive the interrupt control signal from each of the optical fiber data transceivers, wherein the logic unit combines the interrupt control signals from the optical fiber data transceivers into an interrupt combined signal; and
   a processing unit, coupled to the logic unit, wherein the processing unit has an interrupt control pin, the interrupt control pin receives the interrupt combined signal, the processing unit determines whether a logic level of the interrupt combined signal changes, to determine whether any one of the optical fiber data transceivers becomes anomalous or changes, and if the processing unit determines that the logic level of the interrupt combined signal changes, the processing unit executes an interrupt handler and determines, which one of the optical fiber data transceivers becomes anomalous or change wherein the logic unit stores a mask array, the mask array comprises a plurality of mask values, each of the mask values is optionally set to a disabled state or an enabled state and is preset to the disabled state, wherein the disabled state corresponds to a case that each of the optical fiber data transceivers is normal or remains unchanged, the logic unit generates the interrupt combined signal according to each of preset mask values in the disabled state by combining the interrupt control signal from each of the optical fiber data transceivers.

2. The network switch device according to claim 1, wherein the processing unit controls the logic unit to determine whether a logic level of the interrupt control signal from each of the optical fiber data transceivers changes, to determine which one of the optical fiber data transceivers becomes anomalous or changes, and when the processing unit determines that a first optical fiber data transceiver in the optical fiber data transceivers becomes anomalous or changes, the processing unit controls the logic unit to exclude a first interrupt control signal from the first optical fiber data transceiver and combine interrupt control signals from the rest of other optical fiber data transceivers in the optical fiber data transceivers into another interrupt combined signal.

3. The network switch device according to claim 2, wherein the logic unit is further configured to output the another interrupt combined signal to the interrupt control pin.

4. The network switch device according to claim 3, wherein when the first optical fiber data transceiver becomes anomalous or changes, the processing unit changes a first mask value in the mask values that corresponds to the first optical fiber data transceiver from the disabled state to the enabled state, so that the logic unit excludes the first interrupt control signal based on the rest of other mask values in the mask values in the disabled state, to combine the rest of other interrupt control signals into the another interrupt combined signal.

5. The network switch device according to claim 3, wherein the interrupt control signal from each of the optical fiber data transceivers has a preset logic level, and once the first interrupt control signal changes from the preset logic level to another logic level, the processing unit controls the logic unit to exclude the first interrupt control signal.

6. The network switch device according to claim 5, wherein after the logic unit excludes the first interrupt control signal, when the first interrupt control signal restores to the preset logic level, the logic unit regenerates another interrupt combined signal according to the first interrupt control signal and the interrupt control signals generated by the rest of other optical fiber data transceivers.

7. The network switch device according to claim 1, wherein the interrupt control signal from each of the optical fiber data transceivers is preset with a high logic level, the logic unit performs an AND gate operation on the interrupt control signal from each of the optical fiber data transceivers, to generate the interrupt combined signal preset with a high logic level, and the processing unit determines whether the interrupt combined signal changes from the high logic level to a low logic level, to determine whether each of the optical fiber data transceivers becomes anomalous or changes.

8. The network switch device according to claim 1, wherein when the processing unit determines that the logic level of the interrupt combined signal changes, the processing unit further determines, according to whether a logic level of an insertion/extraction signal from each of the optical fiber data transceivers changes, whether an optical fiber signal cable is inserted into an optical fiber port of any one of the optical fiber data transceivers.

9. The network switch device according to claim 1, further comprising a data packet transceiver, coupled between the processing unit and the optical fiber data transceivers, and configured to bidirectionally transmit a data packet between the processing unit and the optical fiber data transceivers.

10. An operating method for a network switch device, comprising:
    receiving, by a logic unit, a plurality of interrupt control signals from a plurality of optical fiber data transceivers, wherein each of the interrupt control signals reflects whether an operating state of each of the optical fiber data transceivers becomes anomalous or changes;
    combining, by the logic unit, the interrupt control signals from the optical fiber data transceivers into an interrupt combined signal;
    receiving, by a processing unit, the interrupt combined signal through an interrupt control pin of the processing unit;
    determining, by the processing unit, whether a logic level of the interrupt combined signal changes; and
    when the processing unit determines that the logic level of the interrupt combined signal changes, executing, by the processing unit, an interrupt handler, and determining which one of the optical fiber data transceivers becomes anomalous or change wherein the logic unit stores a mask array, the mask array comprises a plurality of mask values, each of the mask values is optionally set to a disabled state or an enabled state and is preset to the disabled state, wherein the disabled state corresponds to a case that each of the optical fiber data transceivers is normal or remains unchanged, and in the step of combining, by the logic unit, the interrupt control signals from the optical fiber data transceivers into an interrupt combined signal, the logic unit generates the interrupt combined signal according to each of preset mask values in the disabled state by combining the interrupt control signal from each of the optical fiber data transceivers.

11. The operating method for a network switch device according to claim 10, wherein in the step of determining, by the processing unit, which one of the optical fiber data transceivers becomes anomalous or changes, the processing unit controls the logic unit to determine whether a logic level of the interrupt control signal from each of the optical fiber data transceivers changes, to determine which one of the optical fiber data transceivers becomes anomalous or changes.

12. The operating method for a network switch device according to claim 11, wherein when the processing unit determines that a first optical fiber data transceiver in the optical fiber data transceivers becomes anomalous or changes, the operating method for a network switch device further comprises:
    controlling, by the processing unit, the logic unit to exclude a first interrupt control signal from the first optical fiber data transceiver and combine interrupt control signals from the rest of other optical fiber data transceivers into another interrupt combined signal; and
    receiving, by the processing unit, the another interrupt combined signal through the interrupt control pin of the processing unit.

13. The operating method for a network switch device according to claim 12, wherein when the first optical fiber data transceiver becomes anomalous or changes, the operating method for a network switch device further comprises:

changing, by the processing unit, a first mask value in the mask values that corresponds to the first optical fiber data transceiver from the disabled state to the enabled state.

14. The operating method for a network switch device according to claim 12, wherein in the step of generating the another interrupt combined signal, the logic unit excludes the first interrupt control signal and combine the rest of other interrupt control signals into the another interrupt combined signal according to other mask values in the mask values in the disabled state.

15. The operating method for a network switch device according to claim 12, wherein the interrupt control signal from each of the optical fiber data transceivers has a preset logic level, in the step of excluding the first interrupt control signal, the processing unit controls the logic unit to exclude the first interrupt control signal with a logic level other than the preset logic level, and once the logic unit excludes the first interrupt control signal, the operating method for a network switch device further comprises:

controlling, by the processing unit, the logic unit to determine whether the first interrupt control signal restores to the preset logic level; and when the first interrupt control signal restores to the preset logic level, regenerating, by the logic unit, another interrupt combined signal according to the first interrupt control signal and the interrupt control signals generated by the rest of other optical fiber data transceivers.

16. The operating method for a network switch device according to claim 10, wherein the interrupt control signal from each of the optical fiber data transceivers is preset with a high logic level.

17. The operating method for a network switch device according to claim 16, wherein in the step of combining the interrupt control signals from the optical fiber data transceivers into the interrupt combined signal by the logic unit, the logic unit performs an AND gate operation on the interrupt control signal from each of the optical fiber data transceivers, to generate the interrupt combined signal preset with a high logic level.

18. The operating method for a network switch device according to claim 10, wherein in the step of determining, by the processing unit, which one of the optical fiber data transceivers becomes anomalous or changes, the processing unit determines, according to whether a logic level of an insertion/extraction signal from each of the optical fiber data transceivers changes, which one of the optical fiber data transceivers becomes anomalous or changes.

* * * * *